United States Patent [19]

Miyamori et al.

[11] 4,209,981
[45] Jul. 1, 1980

[54] METHOD AND AN APPARATUS TO CONTROL THE TEMPERATURE OF AN ENGINE EXHAUST GAS PURIFYING DEVICE

[75] Inventors: Yukio Miyamori; Kenji Masaki, both of Yokohama, Japan

[73] Assignee: Nissan Motor Company, Limited, Yokohama, Japan

[21] Appl. No.: 929,025

[22] Filed: Jul. 28, 1978

Related U.S. Application Data

[63] Continuation of Ser. No. 683,825, May 6, 1976, abandoned.

[30] Foreign Application Priority Data

May 16, 1975 [JP] Japan .................................. 50/58908

[51] Int. Cl.² ............................................. F01N 3/14
[52] U.S. Cl. ........................................ 60/274; 60/277; 60/284; 60/285; 60/286; 60/289
[58] Field of Search ................. 60/274, 277, 285, 289, 60/290, 286, 278, 284; 123/119 A, 119 EC

[56] References Cited

U.S. PATENT DOCUMENTS

| 3,086,353 | 4/1963 | Ridgway | 60/290 |
| 3,306,033 | 2/1967 | Cornelius | 123/119 A |
| 3,807,172 | 4/1974 | Masaki | 60/285 |
| 3,906,910 | 9/1975 | Szlaga | 123/119 EC |
| 3,979,905 | 9/1976 | Masaki | 60/289 |
| 4,023,359 | 5/1977 | Masaki | 60/285 |

Primary Examiner—Douglas Hart
Attorney, Agent, or Firm—Robert E. Burns; Emmanuel J. Lobato; Bruce L. Adams

[57] ABSTRACT

The temperature of an exhaust gas purifying device is maintained within an optimum range by enriching an air-fuel mixture for the engine, retarding the ignition timing of the engine, supplying secondary air into engine exhaust gases fed to the purifying device and producing a spark therein when the temperature of the purifying device is below the minimum of the optimum range and by diluting the air-fuel mixture, advancing the engine ignition timing to a normal value, stopping supply of the secondary air and production of the spark when the temperature of the purifying device is higher than the maximum of the optimum range.

3 Claims, 1 Drawing Figure

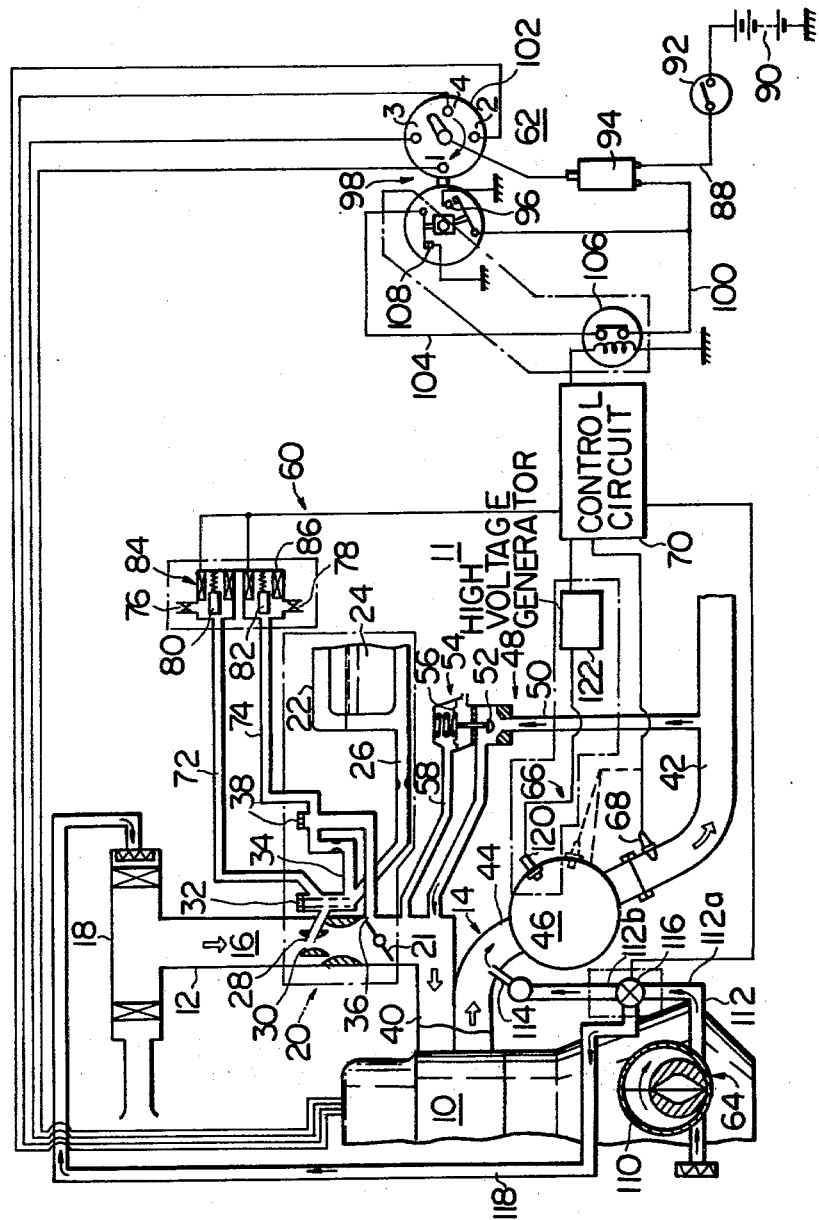

METHOD AND AN APPARATUS TO CONTROL THE TEMPERATURE OF AN ENGINE EXHAUST GAS PURIFYING DEVICE

This is a continuation of application Ser. No. 683,825, filed May 6, 1976, now abandoned.

BACKGROUND OF THE INVENTION

The present invention relates generally to a method of and an apparatus for controlling the performance of an exhaust gas purifying device of an engine to a desired value and particularly to a method of and an apparatus for maintaining the temperature of the exhaust gas purifying device within a desired or optimum temperature range in which the exhaust gas purifying device performs most satisfactorily to purify exhaust gases of the engine.

As is well known in the art, internal combustion engines are now provided with an exhaust gas purifying device such as a thermal or catalytic reactor which oxidizes burnable noxious components such as hydrocarbons (HC) and carbon monoxide (CO) contained in exhaust gases emitted from the engine and renders the burnable components into water ($H_2O$) and carbon dioxides ($CO_2$). The production of nitrogen oxides ($NO_x$) contained in the engine exhaust gases can be reduced by employing a rich or lean air-fuel mixture having an air-fuel ratio lower or higher than a stoichiometric air-fuel ratio. In this instance, the rich air-fuel mixture is usually employed because the lean air-fuel mixture is difficult to ignite and burn in engine combustion chambers. However, by use of the rich air-fuel mixture, the content of the burnable components in the engine exhaust gases is increased to promote the combustion of the engine exhaust gases in the reactor to increase the temperature of the reactor to, for example, above 1,000° C. As a result, there has been a danger that the reactor is heated above its heat resistance limit and is damaged by heat and/or the reactor body is burned and discharged to the atmosphere to cause secondary public nuisance. Furthermore, the use of the rich air-fuel mixture results in increase in the rate of fuel consumption.

On the other hand, it is necessary for combustion of the burnable components in the reactor to maintain the temperature in the reactor above a predetermined level such as, for example, 6,000° C. When the temperature of the reactor is below the predetermined level, the reactor cannot satisfactorily function to purify the engine exhaust gases and allows discharge of engine exhaust gases containing large quantities of burnable noxious components into the atmosphere. Accordingly, when the temperature in the reactor is below the predetermined level as during starting operation of the engine, it is necessary to increase the temperature of the reactor above the predetermined level as quickly as possible.

SUMMARY OF THE INVENTION

It is, therefore, an object of the invention to provide a method of and an apparatus for maintaining the temperature in an exhaust gas purifying device of an engine within a desired or optimum temperature range in which the purifying device most satisfactorily purifies exhaust gases from the engine by controlling the air-fuel ratio of an air-fuel mixture to be burned in a combustion chamber of the engine, the ignition timing of the engine, the amount of secondary air fed into the engine exhaust gases and the ignition of gases in the exhaust gas purifying device so that the exhaust gas purifying device is prevented from being undesirably or excessively heated and from being burned to prevent occurrence of secondary public nuisance, the rate of fuel consumption is reduced, and the temperature in the exhaust gas purifying device is increased in a minimum time to a predetermined level necessary to purify the engine exhaust gases.

BRIEF DESCRIPTION OF THE DRAWING

This and other objects and advantages of the invention will become more apparent from the following detailed description taken in connection with the accompanying drawing which is a schematic view of a preferred embodiment of a combination of an engine and an apparatus for carrying out a method according to the invention.

DESCRIPTION OF THE PREFERRED EMBODIMENTS

Referring to the drawing, there is shown an internal combustion engine 10 and an apparatus 11 for carrying out a method according to the invention and which is combined with the engine 10. The engine 10 comprises intake and exhaust systems 12 and 14. The intake system 12 includes an induction passage or conduit 16 communicating with the atmosphere through an air cleaner 18 and with a combustion chamber (not shown) of the engine 10 for feeding air and an air-fuel mixture into the combustion chamber, and a carburetor 20 including a part of the induction passage 16.

The carburetor 20 includes a throttle valve 21 rotatably mounted in the induction passage 16, a fuel bowl or float chamber 22 containing liquid fuel 24, a main fuel passage 26 communicating with the fuel bowl 22, a main nozzle 28 which communicates with the main fuel passage 26 and which opens into a choke or venturi 30 formed in the induction passage 16, a main air bleed 32 vented to the atmosphere and communicating with the main fuel passage 26 to feed thereinto air for emulsification of fuel fed to the main nozzle 28, a slow running fuel passage 34 branching from the main fuel passage 26 and communicating with a slow running nozzle or port 36 opening into the induction passage 16 at a position immediately downstream of the throttle valve 21 in its fully closed position, and a slow running air bleed 38 vented to the atmosphere and communicating with the slow running fuel passage 34 to feed thereinto air for emulsification of fuel fed to the slow running port 36. The emulsified fuel is drawn into the induction passage 16 through the main nozzle 28 and/or the slow running port 36 by air passing in the induction passage 16 and is mixed with the air to form an air-fuel mixture fed into and burned in the combustion chamber. An intake manifold 40 forming part of the induction passage 16 opens into the combustion chamber.

The exhaust system 14 includes an exhaust gas passage or conduit 42 communicating with an exhaust port (not shown) of the combustion chamber and vented to the ambient atmosphere, an exhaust manifold 44 extending from the exhaust port and forming part of the exhaust gas passage 42, and an exhaust gas treating device 46 such as a thermal reactor or a catalytic converter or reactor which is disposed in the exhaust gas passage 42 at a position adjacent to the exhaust port. The exhaust gas purifying device 46 serves to effect oxidation of burnable components such as hydrocarbons (HC) and carbon monoxide (CO) contained in exhaust gases emitted from the engine 10 and to render the burnable components into water ($H_2O$) and carbon dioxides ($CO_2$). The exhaust gas reburning device 46 is assumed to be a thermal reactor in this embodiment.

The engine 10 is provided with an exhaust gas recirculation (EGR) system 48 for recirculating or feeding engine exhaust gases into the combustion chamber through the induction passage 16 to lower the peak temperature of combustion in the combustion chamber to reduce the amount of nitrogen oxides ($NO_x$) produced by combustion of an air-fuel mixture therein. The EGR system 48 includes an EGR passage or conduit 50 branching from the exhaust gas passage 42 at a position upstream of or downstream of the thermal reactor 46 and terminating in the induction passage 16 at a position downstream of the throttle valve 21, and a flow control valve 52 disposed in the EGR passage 50 and operable to control or meter the flow rate of engine exhaust gases fed into the induction passage 16 to a predetermined ratio to the flow rate of air drawn into the combustion chamber. The flow control valve 52 includes an actuator 54 having a flexible diaphragm 56 which is operatively connected to the flow control valve 52 and is operated or deformed in response to the vacuum in the induction passage 16 at a position downstream of the throttle valve 21 which vacuum is fed through a passage or conduit 58 to the diaphragm 56. The actuator 54 operates the flow control valve 52 with the diaphragm 56 in such a manner as to increase and reduce the degree of opening of the valve 52 in accordance with decrease and increase in the induction passage vacuum, respectively.

The apparatus 11 serves to maintain the temperature of the combustion temperature in the exhaust gas treating device 46 within a desired or optimum temperature range within which the device 46 treats or purifies the engine exhaust gases not satisfactorily or efficiently to maximize the amount of the burnable components rendered harmless and is simultaneously prevented from being damaged by undesirably high temperatures. The optimum temperature range is assumed as, for example, 800° to 900° C. in this embodiment. The minimum and maximum (800° C. and 900° C.) of the predetermined temperature range are hereinafter referred respectively to as first and second desired temperatures or levels. The apparatus 11 comprises an air-fuel ratio control device 60 or a combination of the device 60 and one or more of an ignition timing control device 62, a secondary air supply control device 64, and an exhaust gas ignition control device 66.

The air-fuel ratio control device 60 comprises sensing means 68 such as a thermistor or thermocouple which is located in the reactor 46 or on an external wall surface thereof or in the exhaust gas passage 42 at a position adjacent to and downstream of the reactor 46. The sensor 68 senses the temperature or combustion temperature in the reactor 46 or a temperature corresponding to or representing the temperature or reaction temperature thereof and generates an electric output signal having a value representing the sensed temperature and is electrically connected to a control circuit 70 to apply the temperature signal thereto. The comparator circuit 70 compares the value of the temperature signal with first and second reference values corresponding respectively to the first and second desired temperatures and generates first and second electric error signals when the value of the temperature signal is smaller and larger than the first and second reference values, respectively. The air-fuel ratio control device 60 also comprises first and second auxiliary air bleeds 72 and 74 for feeding respectively into the main and slow running fuel passages 26 and 34 additional air for mixing with or emulsifying fuel therein. The auxiliary air bleeds 72 and 74 open into the atmosphere through inlet ports 76 and 78 and include therein control valves 80 and 82 for closing and opening the auxiliary air bleeds 72 and 74 to separate the main and slow running fuel passages 26 and 34 from the inlet ports 76 and 78, respectively. The control valves 80 and 82 are provided respectively with solenoids 84 and 86 for operating same and which are electrically connected to the comparator circuit 70 to receive therefrom the first and second error signals. The solenoids 84 and 86 cause the control valves 80 and 82 to close the auxiliary air bleeds 72 and 74 in response to the first error signal and to open the auxiliary air bleeds 72 and 74 in response to the second error signal.

The combination of the engine 10 and the air-fuel ratio control device 60 thus far described is operated as follows:

The emulsified fuel is drawn from the main and/or slow running nozzle 28 and/or 36 into the induction passage 16 and is mixed with air therein to form an air-fuel mixture which is drawn into and burned in the combustion chamber. When the sensor 68 senses the reaction temperature in the reactor 46 being less than the first desired temperature, the control valves 80 and 82 close the auxiliary air bleeds 72 and 74 in response to the first error signal of the comparator circuit 70 so that the amount of fuel fed from the main and slow running fuel passages 26 and 34 into the induction passage 16 is increased by the amount of air from the auxiliary air bleeds 72 and 74 to form an enriched air-fuel mixture. This causes an increase in the content of burnable components in the engine exhaust gases to intensify the combustion of the engine exhaust gases in the reactor 46 to increase the combustion temperature therein. When the sensor 68 senses the combustion temperature in the reactor 46 being increased above the second desired temperature, the control circuit 70 generates the second error signal in response to which the control valves 80 and 82 open the auxiliary air bleeds 72 and 74 to reduce the amount of fuel fed from the main and slow running fuel passages 26 and 34 into the induction passage 16 by the amount of air fed from the auxiliary air bleeds 72 and 74 to form a diluted or lean air-fuel mixture. As a result, the content of the burnable components in the engine exhaust gases is reduced to reduce the intensity of combustion of the engine exhaust gases in the reactor 46 to reduce the reaction temperature therein. By repetition of the above-mentioned operation, the reaction temperature in the thermal reactor 46 is maintained at the optimum temperature range.

The ignition timing control device 62 comprises a primary circuit 88 including an electric power source 90, an ignition switch 92, an ignition coil 94 and a usual or normal ignition timing breaker contact 96 of an ignition distributor 98, a secondary circuit 100 including the ignition coil 94 and a high voltage current distributor 102 of the ignition distributor 98, the sensor 68, the comparison circuit 70, and an ignition timing retarding circuit 104 including a relay switch 106 and a retarding breaker contact 108 connected in series to each other. The ignition timing retarding circuit 104 is connected to the comparison circuit 70 and in parallel to the primary circuit 88. The retarding breaker contact 108 is set to be opened later than the usual ignition timing breaker contact 96 at every cycle of the engine 10. When the relay switch 106 is opened, the engine 10 is ignited at a normal timing by the usual breaker contact 96 at every cycle.

The combination of the engine 10 and the ignition timing control device 62 thus far described is operated as follows:

When the sensor 68 senses the reaction temperature in the reactor 46 being lower than the first desired level, the relay switch 106 is supplied with the first error signal from the control circuit 70 and is closed to complete the ignition timing retarding circuit 104. Since the retarding breaker contact 108 is connected in parallel with the normal breaker contact 96 due to the completion of the circuit 104, a high voltage is not yet generated in the secondary circuit 100 so as not to produce a spark in the combustion chamber when the normal ignition timing breaker contact 96 is opened and the retarding breaker contact 108 is still closed. The high voltage is generated in the secondary circuit 100 to produce the spark in the combustion chamber when the retarding breaker contact 108 is opened with a time lag after the usual breaker contact 96 has been opened. Accordingly, when the ignition timing retarding circuit 104 is completed, the ignition timing of the engine 10 is retarded by the time lag as compared with when the engine ignition is effected at the normal timing by the usual breaker contact 96. The delay in the ignition timing prolongs the combustion of the air-fuel mixture in the engine combustion chamber to increase the temperature of the engine exhaust gases and accordingly the reaction temperature in the reactor 46. As a result, when the sensor 68 senses the combustion temperature in the reactor 46 being increased above the second desired level, the relay switch 106 is supplied with the second error signal from the comparator circuit 70 so that it is opened to open the ignition timing retarding circuit 104 to restore the ignition timing into a normal condition. This causes rapid combustion; This causes lengthening of the combustion time in the engine combustion chamber to reduce the temperature of the engine exhaust gases as compared with those produced by the retarded timing. By EGR further reduces this temperature repetition of the above-mentioned operation, the reaction temperature in the reaction 46 is maintained at the optimum temperature range.

The secondary air supply control device 64 comprises an air pump 110 to discharge secondary air under pressure, passage means 112 communicating at one end with a discharge port of the air pump 110 and opening at the other end into the exhaust gas passage 42 at a position upstream of the exhaust gas treating device 46 through an injecting nozzle 114, a flow path control valve 116 for alternatively communicating the upstream part 112a of the passage means 112 with the downstream part 112b of the passage means 112 and with the atmosphere in accordance with the error signals, and branch passage means 118 communicating at one end with the upstream part 112a through the control valve 116 and opening at the other end into the air cleaner 18. The control valve 116 includes an actuator such as a solenoid (not shown) electrically connected to the control circuit 70 to receive the error signals therefrom and operates the control valve 116 to communicate the upstream part 112a with only the downstream part 112b in response to the first error signal and with only the branch passage means 118 in response to the second error signal.

The combination of the engine 10 and the secondary air supply control device 64 thus far described is operated as follows:

When the sensor 68 senses the combustion temperature in the reactor 46 being lower than the first desired level, the control valve 116 is operated in response to the first error signal from the control circuit 70 to communicate the air pump 110 with the exhaust gas passage 42 to supply secondary air thereinto so that the combustion of the burnable components in the engine exhaust gases in the reactor 46 is promoted to cause increase in the combustion temperature in the reactor 46. As a result, when the sensor 68 senses the combustion temperature in the reactor 46 being increased higher than the second desired level, the control valve 116 is operated in response to the second error signal from the control circuit 70 to switch over connection of the upstream part 112a from the downstream part 112b to the branch passage means 118 to stop supply of secondary air into the exhaust gas passage 42 and to divert secondary air to the air cleaner 18. As a result, the intensity of the combustion in the reactor 46 is reduced to bring the reaction temperature in the reactor 46 into the desired temperature range. By repetition of the above-mentioned operation, the reaction temperature in the reactor 46 is maintained within the desired temperature range.

The exhaust gas ignition control device 66 comprises a spark plug 120 located in the reactor 46, and a high voltage generator 122 electrically connected to the spark plug and to the control circuit 70 to receive the error signals therefrom.

The combination of the engine 10 and the exhaust gas ignition control device 66 thus constructed is operated as follows:

When the sensor 68 senses the combustion temperature in the reactor 46 being less than the first desired value, the high voltage generator 122 generates a high voltage in response to the first error signal from the control circuit 70 so that the spark plug 120 provides a spark in the reactor 46 to facilitate ignition of and promote combustion of the engine exhaust gases in the reactor 46 to cause increase in the combustion temperature in the reactor 46. In this instance, the spark plug 120 makes possible ignition of engine exhaust gases resulting from an air-fuel mixture which is so lean that ignition of the exhaust gases is impossible unless a spark is provided by a spark plug. When the sensor 68 senses the combustion temperature in the reactor 46 being increased higher than the second desired value, the high voltage generator 122 stops generation of the high voltage in response to the second error signal from the control circuit 70 so that the spark plug 120 ceases production of the spark to lighten combustion in the reactor 46 to reduce the combustion temperature in the reactor 46. By repetition of the above-mentioned operation, the combustion temperature in the reactor 46 is maintained within the desired temperature range.

As the result of the temperature in the reactor 46 being maintained at the desired range by providing the engine 10 with the device 60 or the combination of the device 60 and one or more of the devices 62, 64 and 66, the reactor 46 satisfactorily performs its function of purifying the engine exhaust gases to reduce the content of the burnable noxious components therein to a satisfactory or minimum value. It is also prevented from being undesirably heated and damaged or from being burned to eliminate the occurrence of secondary public nuisance, and is heated or warmed up in a reduced or minimum time to a temperature necessary to purify the engine exhaust gases as during starting operation of the engine 10. Thus the engine 10 is supplied with a minimum of fuel to reduce the rate of fuel consumption.

It will be appreciated that the invention provides a method of maintaining the temperature in an exhaust gas purifying device of an engine at a desired range which comprises the first step of enriching or diluting an air-fuel mixture for the engine when the temperature of the purifying device is above or below the minimum or maximum of the desired range, or, the first step and one or more of the following, which includes: the second step of retarding or advancing the ignition timing of the engine from or to a normal value, the third step of effecting or stopping supply of secondary air into the engine exhaust gases fed to the purifying device, and the fourth step of producing a spark in the purifying device or stopping production of the spark, when the temperature of the purifying device is above or below the minimum and maximum of the desired range, so that the purifying device most satisfactorily performs its function of purifying engine exhaust gases to reduce the contents of the burnable components therein to a satisfactory or minimum value. Thus the purifying device is prevented from being undesirably heated and from being burned to eliminate the occurrence of secondary public nuisance and is heated in a reduced or minimum time to a temperature necessary to purify the engine exhaust gases, and the engine is supplied with a minimum of fuel to reduce the rate of fuel consumption, and that the invention provides an apparatus for carrying out the method.

With the secondary air supply control device 64, secondary air can be fed or drawn into the exhaust gas passage 42 by a vacuum produced in the exhaust gas passage 42 or in a venturi formed therein in place of the air pump 110.

The exhaust gas treating device 46 may be merely an exhaust manifold which is provided therein with a port liner and serves to purify engine exhaust gases, in place of the thermal or catalytic reactor.

What is claimed is:

1. In an internal combustion engine having an induction system including an air-fuel mixture forming means, a combustion chamber, an exhaust system including an exhaust purifying device and an exhaust gas recirculation system interconnecting said induction and exhaust systems, a method of rapidly raising and lowering the temperature in said purifying device between a predetermined upper temperature and a predetermined lower temperature comprising the steps of:
    recirculating exhaust gas from said exhaust system to said induction system for lowering the peak combustion temperature in said combustion chamber;
    sensing the temperature prevailing in said purifying device;
    generating a first command signal when said temperature in said purifying device is sensed at or below said lower temperature and continuing to generate said command signal until said temperature in said purifying device rises to said upper temperature;
    generating a second command signal when said temperature in said purifying device is sensed at or above said upper temperature and continuing to generate said second command signal until said temperature in said purifying device decreases to said lower temperature;
    raising the temperature in said purifying device in response to said first command signal by:
    enriching the air-fuel mixture produced by said air-fuel mixture forming means;
    retarding the ignition timing of the ignition of said enriched air-fuel mixture in said combustion chamber;
    supplying secondary air into said exhaust system upstream of said purifying device; and
    producing sparking in said purifying device so as to positively ignite the large amount of combustible matter issuing from said combustion chamber due to said retarded ignition and enriched air-fuel mixture in the presence of said secondary air thus negating th effect of the lowering of the peak combustion temperature by said recirculation of exhaust gas; and
    lowering the temperature in said purifying device in response to said second command signal by
    leaning said air-fuel mixture produced by said air-fuel mixture forming means;
    advancing the ignition timing of the ignition of said leaned air-fuel mixture in said combustion chamber so as to efficiently combust said mixture thus reducing the amount of combustible matter subsequently exhausted into said exhaust system;
    terminating the supply of said secondary air; and
    terminating the production of said sparking, so that exhaust gases having a relatively low temperature due to the suppression of said peak combustion temperature by said exhaust gas recirculation and which contain relatively little combustible matter are fed into said purifying device permitting the temperature thereof to tend toward said lower temperature.

2. A method of operating an internal combustion engine so as to rapidly raise the temperature of an exhaust gas purifying device associated with said engine and subsequently maintain the temperature of said purifying device within predetermined upper and lower limits comprising the steps of:
    recirculating exhaust gas into the combustion chamber to reduce the peak combustion temperature of the air-fuel mixture combusted therein;
    raising the temperature of said purifying device from below said lower limit to said upper limit via;
    increasing the concentration of combustible matter in the exhaust gases emitted from said combustion chamber of said engine;
    mixing secondary air with said exhaust gases prior to entry into said purifying device;
    igniting and combusting the mixture of exhaust gas and secondary air in said purifying device so as to rapidly heat same to said upper limit;
    lowering the temperature of said purifying device from or from above said upper limit toward said lower limit via;
    reducing the concentration of combustible matter in the exhaust gases which in combination with the effect of temperature reduction produced by said recirculating of said exhaust gases reduces the temperature and degree of combustion in said purifying device, whereby the temperature of said purifying device falls to said lower limit; and cyclically repeating said step of raising and said step of lowering to maintain the temperature within said upper and lower limits.

3. In an internal combustion engine having a combustion chamber, an induction system and an exhaust system;

an exhaust gas recirculation system interconnecting said induction and exhaust systems for recirculating exhaust gas from said exhaust system to said induction system according to a schedule which varies in accordance with the load on said engine;

a gas purifying device disposed in said exhaust system for purifying the exhaust gases emitted from said combustion chamber;

a temperature sensor disposed in said exhaust system and arranged to sense the temperature prevailing in said purifying device and produce an electrical signal representative of the sensed temperature;

a control circuit responsive to said electrical signal and arranged to produce a first command signal upon the temperature in said purifying device being sensed at or below a first predetermined lower level and continue to produce said first command signal until the temperature in said purifying device rises to a second predetermined upper temperature and to produce a second command signal upon the temperature in said purifying device being sensed at or above said upper temperature and continue to produce said second command signal until the temperature in said purifying device decreases to said lower level;

an air-fuel mixture forming device disposed in said induction system and responsive to said first and second command signals for producing respectively first and second air-fuel mixtures which have first and second air-fuel ratios respectively, said first air-fuel ratio being lower than said second;

an ignition system for producing a spark in said combustion chamber and responsive to said first and second command signals to produce sparks at first and second ignition timings, said first ignition timing being retarded with respect to the second;

a secondary air system for injecting secondary air into said exhaust system upstream of said purifying device in response to said first command signal and relieving said secondary air to the ambient atmosphere in response to said second command signal; and a purifying device ignition system for producing sparking in said purifying device in response to said first command signal.

* * * * *